June 27, 1933.    H. LENZ    1,915,541
SOWING MACHINE
Filed March 17, 1930    3 Sheets-Sheet 1

Inventor:
HANS LENZ
BY Richards & Geier
ATTORNEYS

June 27, 1933.  H. LENZ  1,915,541
SOWING MACHINE
Filed March 17, 1930   3 Sheets-Sheet 2

Inventor:
HANS LENZ
BY Richards & Geier
ATTORNEYS

June 27, 1933.    H. LENZ    1,915,541
SOWING MACHINE
Filed March 17, 1930    3 Sheets-Sheet 3

Inventor:
HANS LENZ
BY Richardson Grier
ATTORNEYS

Patented June 27, 1933

1,915,541

UNITED STATES PATENT OFFICE

HANS LENZ, OF AUGSBURG, GERMANY

SOWING MACHINE

Application filed March 17, 1930, Serial No. 436,299, and in Germany June 24, 1927.

This invention relates to a single-seed sowing machine the construction of which differs materially from that of known machines of the same kind.

Figure 1:
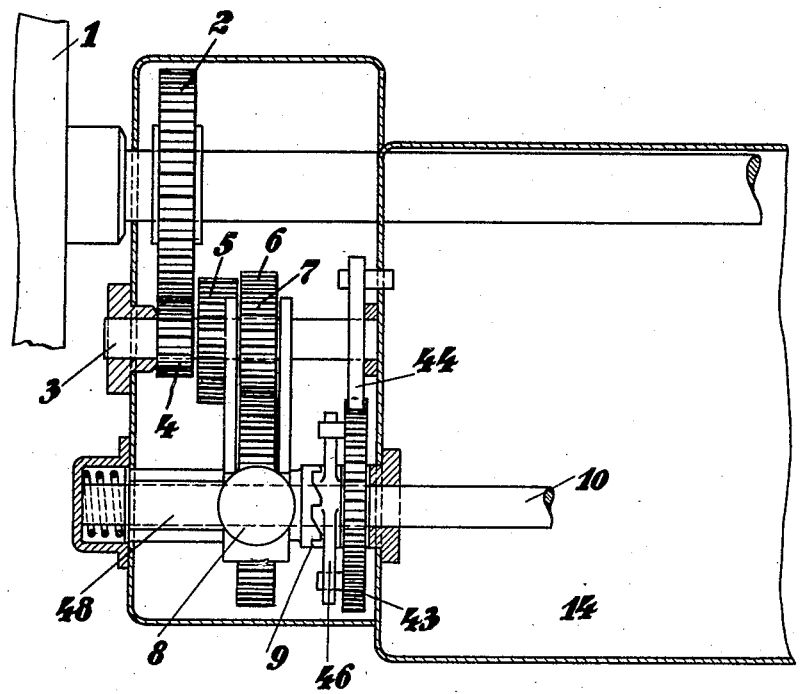
Figure 2:
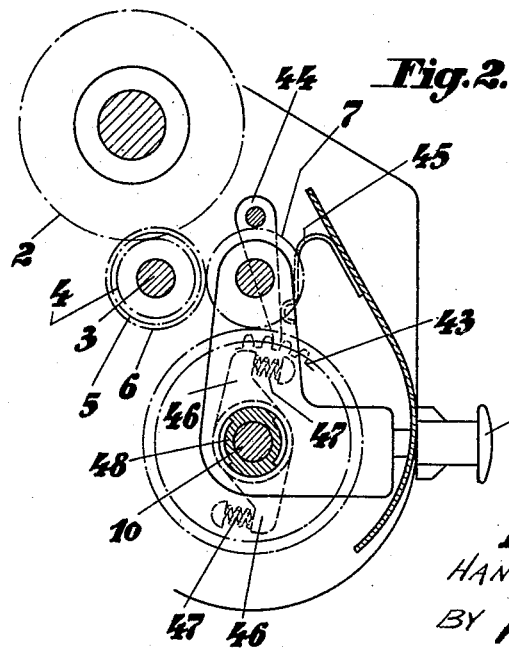
Figure 3:
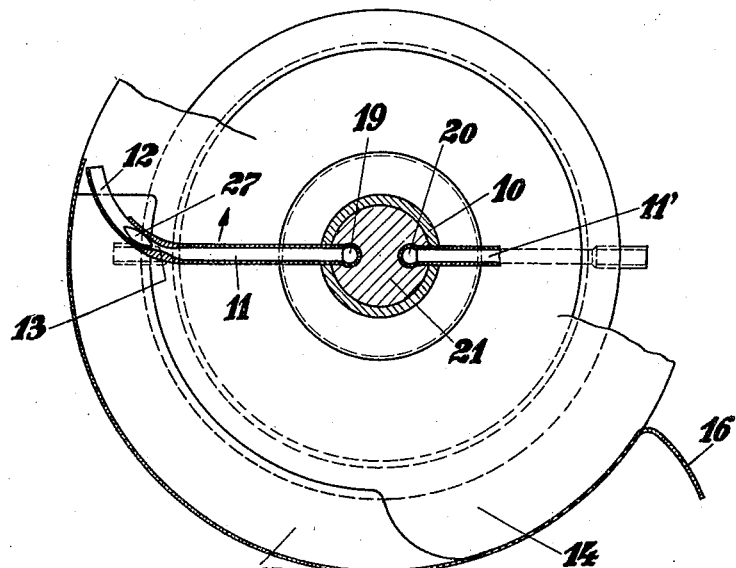
Figure 4:
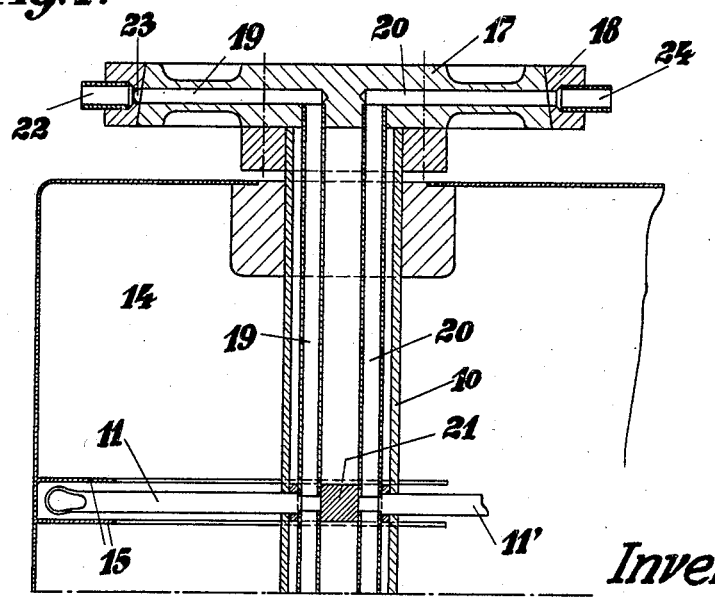

The object of the invention is shown in Figs. 1–4 of the drawings. Fig. 1 is a section partially longitudinal of the seed container and the driving mechanism of the novel sowing machine; Fig. 2 is a side view of the same; Figs. 3–6 showing in detail in what manner each separate grain of seed is taken up and ejected.

The motive power proceeds, as shown in Fig. 1, from pinion 1 on the shaft of which a gear wheel 2 also is mounted which engages with another gear wheel 4 mounted on jack shaft 3. On the same jack shaft further gear wheels 5 and 6 are mounted side by side. Any of these gear wheels 4, 5 and 6 may alternately be made to engage with gear wheel 7 as that wheel, being mounted on a journal box may, by means of a lever 8, be moved in axial direction. Special appliances, not shown in the drawings, arrest the slidable gear wheel in the position selected. As may be noted the arrangement of the three gear wheels 4, 5, 6 and the slidable wheel 7 permits to vary the velocity of motion of the machine and thus also the sowing width or distance in the furrow between any two successive seeds. With the parts in the relative position shown in the drawings the motion is the slowest and the sowing width the greatest attainable. The mechanism operates as follows.

The gearing already described may, by means of an elastic claw coupling be coupled with shaft 10, thus causing this shaft also to rotate. Two scoop shaped sowing members 11 and 11' are provided on this shaft each of which ending in a groove 12 which opens into a small funnel 13. The preferred form of the novel machine here described shows only two of such sowing members but of course any number of these members may be provided along the shaft and around its circumference. The sowing scoops revolve continually within the seed container 14 taking up a few seeds when in their lowest position. As the scoop continues to rotate the seeds will glide down the groove and, aided by vibration eventually reach the funnel 13 where one of them, 27, will settle, while the surplus seeds slide past it and drop back into the container. Lateral guide plates 15 prevent the seeds getting spilled sideways. They also stop the seeds from amassing on one side of the container in case the container assumes a sloping position. When the scoop, continuing to rotate, eventually arrives above the aperture 16, funnel 13 at the same moment will be in a position which causes the seed to drop and the seed is ejected.

When the machine is operating on rough land the seed within the funnel 13 may be secured in its position by compressed air, by suction or mechanically.

Suction or compressed air which may be produced for the purpose in any convenient manner, is supplied by means of a distributing disk 17 fast on shaft 10. Affixed to this is a supply ring 18. The distributing disk is connected with the sowing scoops by conduits 19 and 20 which open into a body 21 upon which the scoops are disposed. The grains are picked up in the manner already described. Now as soon as one of them has settled in the funnel 13 and the scoop has attained a certain position, the aperture of conduit 19, or 20 respectively, arrives in front of the suction aperture 22 and by means of groove 23 remains connected therewith almost until the moment of ejection. At this moment conduit 19, or 20 respectively, arrives in front of aperture 24 of the air conduit, air enters by 19, or 20 respectively, into the sowing body 11, or 11' respectively, and the grain is instantly ejected. Suction or compressed air may also be distributed by means of two separate distributing disks.

Figure 5:
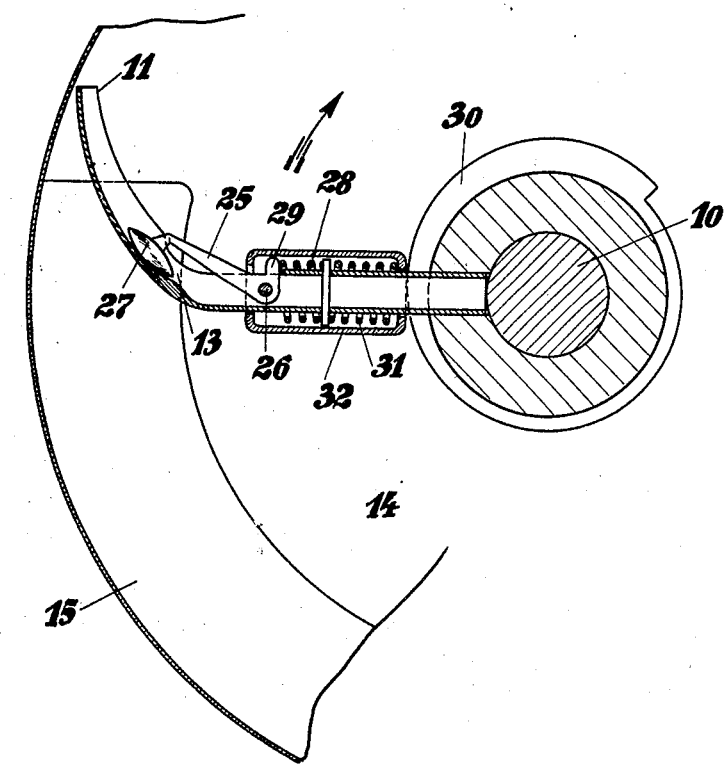

If, according to Fig. 5, the seed is mechanically to be held in position previous to being ejected, the sowing body is mounted on shaft 10. A gripper 25 is for this purpose provided on the body, which gripper is acted upon by a spring, and may swing round point 26. The action of the gripper 25 is controlled by spring 28 which presses upon a projection 29 of the gripper 25 thereby pushing its disengaged end against the bottom of the groove and thus holding the seed 27 down. The alternate holding and releasing of successive seeds is effected by means of a fixed cam disk 30 the curvature of which will alternately put the spring 28 controlling pawl 25 under tension and release it and thus alternately depress gripper 25 and raise it again. The scoops 11 rotate within the container 14, while in their lowest position pick up a number of grains of which one, 27, in due course settles in the funnel 13 and is held there by pawl 25. The instant the scoop arrives above the ejecting aperture, the fixed cam disk 30 releases upright tube 32 upon which a spring 31 acts which is stronger than spring 28, and thus also releases gripper 25 and the seed 27 is ejected through the aperture.

Figure 6:
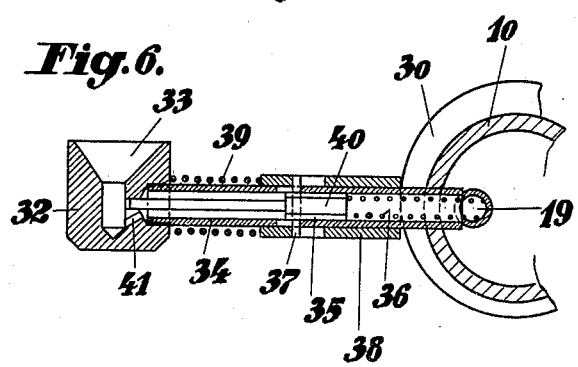

Single grains of seed may also be picked up and ejected by means of a sowing body according to Fig. 6 which, although differing in shape from the one described above, operates on the same principle. It consists of a head 32 with funnel 33 affixed to the end of a pipe 34. Within the pipe 34 a piston 35 glides which is acted upon by a spring 36. By means of a pin 37 the piston 35 is connected with a box 38 which is acted upon by a spring 39. The whole is mounted on shaft 10. Head 32 in passing through the seeds in the container picks up a number of them. Vibrations cause one of the seeds to settle in the funnel 33. Now fixed cam disk 30 pushes box 38 forward thereby releasing pin 37 which is fixed on piston 35, the spring pushes the piston forward and seed 27 is thereby held down. As soon as the sowing body arrives above the sowing aperture 16, disk 30 releases box 38 which is then pushed back by spring 39 and by means of pin 37 causes piston 35 to participate in the movement. The seed then drops.

Compressed air or suction may also be utilized in sowing by means of the sowing body just described.

To this end piston 35 is provided with two lateral grooves which allow the air to pass. The air then travels through channel 19, grooves 40 and bore 41 to the funnel 33.

Vibrations facilitate the operations of picking up and ejecting the seeds; for which reason the means described below are essential to the machine according to the invention.

With elastic coupling 9 is connected a gear wheel 43. A pawl 44 upon which a plate spring 45 acts, engages with gear wheel 43. On the one half of the coupling two projections 46 are provided which also are acted on by springs 47 in such manner that pawl 44 deals gear wheel 43 a succession of gentle taps which projections 46 transmit to the gear wheel in form of slight oscillations. This causes continuous vibrations of shaft 10 and scoops 11. If the machine moves rearward the bushing 48 will, against the action of a spring be pushed outward, whereby the working shaft 10 is brought to a standstill. The shaking device may be of any other than the construction described.

I claim:

1. A single-seed sowing machine comprising in combination a seed container, a shaft, a plurality of sowing members thereon, a gear wheel, a spring-looded pawl adapted to deal said gear wheel short blows and elastic coupling connecting said shaft and said gear wheel whereby the blows dealt to said gear wheel are transmitted as oscillations to said shaft thus causing said sowing members to vibrate.

2. A single-seed sowing machine, comprising in combination, a seed container, a rotary shaft, a plurality of sowing members within said container connected with said shaft and adapted to rotate therewith, each of said sowing members being provided with a cavity at its end furthest from said shaft, said cavity opening into a funnel adapted to hold one single seed, said sowing members taking up into said cavity a plurality of seeds moved towards said funnel during the upward movement of said members and thrown back during said upward movement into said container with the exception of said one seed ejected out of the machine during the downward movement and means for causing a vibration of said members.

3. A single-seed sowing machine, comprising in combination, a seed container, a rotary shaft, a plurality of sowing members within said container connected with said shaft and adapted to rotate therewith, each of said sowing members having a bent end and being provided with a groove opening into a funnel adapted to hold one single seed, said sowing members taking up into said groove a plurality of seeds moved towards said funnel during the upward movement of said members and thrown back during said upward movement into said container with the exception of said one seed, a gripper for holding said seed and a spring controlling said gripper, said seed being ejected out of the machine during the downward movement of said members.

4. A single-seed sowing machine according to claim 2 comprising compressed air means for holding through suction said seed within said funnel connected by a channel with said compressed air means.

5. A single-seed sowing machine, comprising in combination, a seed container, a rotary shaft, a plurality of sowing members within said container connected with said shaft and adapted to rotate therewith, each of said sowing members comprising a funnel, a second funnel connected with the first-mentioned funnel, a tube member connecting said funnels with said shaft, a movable piston within said tube and a spring acting upon said piston, a cam disc and a sleeve moving said piston, each of said sowing members holding one single seed each during the rotation of said sowing members until said seed is ejected during the downward movement of said members.

6. A single-seed sowing machine, comprising in combination, a seed container, sowing members, a hollow shaft, tubes within said shaft, a distributing disc, a supply ring, means for connecting said sowing members with said shaft and means for separately supplying compressed air to each of said sowing members.

7. A single-seed sowing machine according to claim 2, comprising a driving gear, a gear wheel elastically coupled with said driving gear and a pawl adapted to deal said gear wheel short blows whereby the shaft of said driving gear is continuously vibrated.

8. A single-seed sowing machine according to claim 2, comprising compressed air means for holding one seed within each of said sowing members, a rigid air conducting ring, and a rotary air distributing disc provided with air passages, said passages conducting air separately to said member.

In testimony whereof I have affixed my signature.

HANS LENZ.